United States Patent
Chagoly et al.

(10) Patent No.: US 7,793,154 B2
(45) Date of Patent: Sep. 7, 2010

(54) METHOD AND IMPLEMENTATION FOR AUTOMATING PROCESSES USING DATA DRIVEN PRE-RECORDED TRANSACTIONS

(75) Inventors: Bryan Christopher Chagoly, Austin, TX (US); Brian Derek Hernandez, Leander, TX (US); James Patrick O'Donnell, III, Austin, TX (US); Rama S. Vykunta, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 632 days.

(21) Appl. No.: 11/565,218

(22) Filed: Nov. 30, 2006

(65) Prior Publication Data
US 2008/0133210 A1    Jun. 5, 2008

(51) Int. Cl.
*G06F 11/00*    (2006.01)
(52) U.S. Cl. .......................... 714/38; 703/22
(58) Field of Classification Search .................. 714/38; 703/22
See application file for complete search history.

(56) References Cited

U.S. PATENT DOCUMENTS

| | | | |
|---|---|---|---|
| 5,600,780 A | 2/1997 | Hiraga et al. | |
| 5,600,789 A * | 2/1997 | Parker et al. | 714/38 |
| 5,905,856 A * | 5/1999 | Ottensooser | 714/38 |
| 6,360,332 B1 * | 3/2002 | Weinberg et al. | 714/4 |
| 6,532,023 B1 | 3/2003 | Schumacher et al. | |
| 6,587,969 B1 * | 7/2003 | Weinberg et al. | 714/46 |
| 6,983,468 B1 | 1/2006 | Green et al. | |
| 7,454,660 B1 * | 11/2008 | Kolb et al. | 714/38 |
| 7,543,189 B2 * | 6/2009 | Fichter et al. | 714/38 |
| 2002/0143931 A1 | 10/2002 | Smith et al. | |
| 2002/0157088 A1 | 10/2002 | Rompala et al. | |
| 2003/0227480 A1 | 12/2003 | Polk | |
| 2003/0229825 A1 * | 12/2003 | Barry et al. | 714/38 |
| 2004/0003325 A1 * | 1/2004 | Muller et al. | 714/38 |
| 2004/0041827 A1 * | 3/2004 | Bischof et al. | 345/704 |
| 2004/0070612 A1 | 4/2004 | Sinclair et al. | |
| 2004/0078692 A1 * | 4/2004 | Jackson et al. | 714/38 |
| 2004/0153992 A1 | 8/2004 | Molina-Moreno et al. | |
| 2004/0207659 A1 | 10/2004 | Goodman et al. | |
| 2005/0114253 A1 | 5/2005 | Low, III | |
| 2005/0166094 A1 * | 7/2005 | Blackwell et al. | 714/38 |
| 2006/0085681 A1 * | 4/2006 | Feldstein et al. | 714/25 |
| 2006/0155807 A1 | 7/2006 | Loupia et al. | |
| 2006/0168115 A1 | 7/2006 | Loupia et al. | |
| 2006/0253742 A1 * | 11/2006 | Elenburg et al. | 714/38 |
| 2008/0072100 A1 * | 3/2008 | Okada | 714/28 |

* cited by examiner

*Primary Examiner*—Robert Beausoliel
*Assistant Examiner*—Elmira Mehrmanesh
(74) *Attorney, Agent, or Firm*—Yee & Associates, P.C.; Jeffrey S. LaBaw (57) ABSTRACT

A computer implemented method, data processing system, and computer program product for automating processes using data driven pre-recorded transactions. A process server comprising process modeling tools creates workflows comprising activities linked together based on a set of rules. A test script server connected to one or more activities in a workflow receives requests from the one or more activities to automate an activity. A remote test script agent connected to the test script server receives instructions from the test script server to play back a robotic test script of the activity, wherein the robotic test script is driven by a set of input parameters obtained from recording the activity, and wherein the robotic test script interacts with an application under test to perform the activity as an automated task.

13 Claims, 3 Drawing Sheets

METHOD AND IMPLEMENTATION FOR AUTOMATING PROCESSES USING DATA DRIVEN PRE-RECORDED TRANSACTIONS

BACKGROUND OF THE INVENTION

1. Field of the Invention

The present invention relates generally to an improved data processing system, and in particular, to a method and implementation for automating processes using data driven pre-recorded transactions.

2. Description of the Related Art

In the current art, there are several growing fields of interest regarding business transaction performance and availability. One field is business process automation (BPA), which is the process of using technology to replace a manually performed process with an automated process. With business process automation tools, customers are able to integrate, automate, and formalize their business processes while lowering costs and process times.

Another growing field is automated testing, which allows customers to compile data about business transactions occurring on their Web sites by manually recording and playing back these transactions. Some examples of existing automated testing products include Rational Robot, Rational Performance Tester, Rational XDE, and Rational Functional Tester, among others. Within an automated test area, a recording component captures performance data about actual user transactions that are executed against elements (e.g., Web servers, Web application servers) of the business environment. A playback component executes the recorded transactions to simulate actual user activity. These simulated transactions are known as synthetic transactions.

A third field is automated business process performance and availability monitoring which uses the automated test scripts created in the automated test area to monitor the business environment for performance and availability problems. One example of a performance and availability monitor is Tivoli Composite Application Manager for Response Time Tracking (RTT), which is a centrally managed suite of software components that monitor the availability and performance of Web-based services and operating system applications. RTT allows the customer to reuse the automated test script assets in production for proactive monitoring of their business applications. These assets are typically defined by a management policy and distributed to remote playback agents to determine performance and availability of the application from worldwide locations. For example, customers can reuse automated test scripts in RTT to playback business transactions for Windows GUI applications and HTTP web transactions to allow a customer to determine the manner by which transactions are processed by the various elements of the electronic business, and thus, which processes are causing problems and where the processes may be improved.

SUMMARY OF THE INVENTION

The illustrative embodiments provide a computer implemented method, data processing system, and computer program product for automating processes using data driven pre-recorded transactions. A process server comprising process modeling tools is provided for creating a workflow of a set of process interactions. The workflow comprises a plurality of activities linked together based on a set of rules. A test script server is connected to one or more activities in the workflow on the process server, wherein the test script server receives requests from the one or more activities to automate an activity. A remote test script agent is connected to the test script server, wherein the remote test script agent receives instructions from the test script server to play back a robotic test script of the activity, wherein the robotic test script is driven by a set of input parameters obtained from recording the activity, and wherein the robotic test script interacts with an application under test to perform the activity as an automated task.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
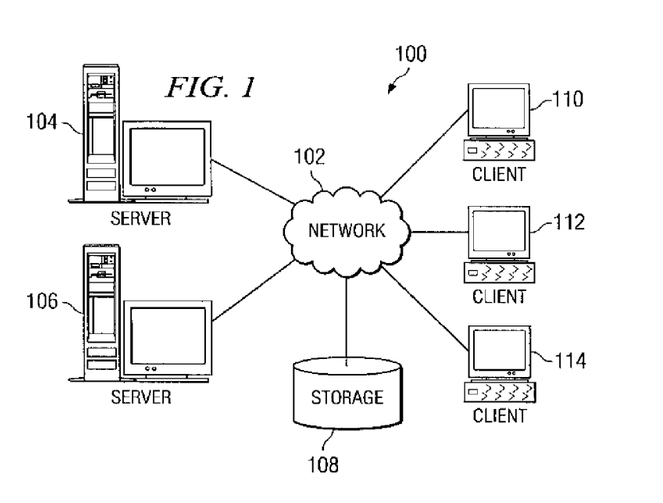
FIG. 1 depicts a pictorial representation of a distributed data processing system in which the illustrative embodiments may be implemented.
Figure 2:
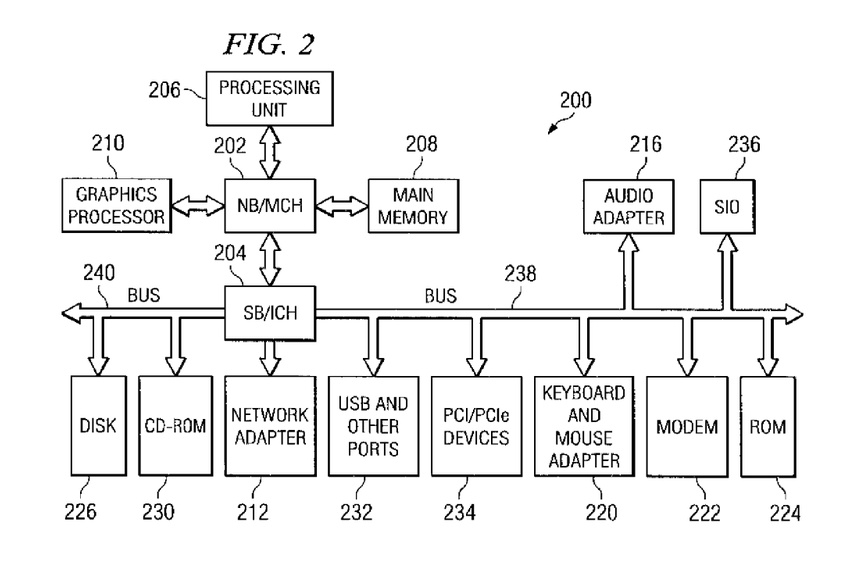
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system may run in conjunction with the operating system and provides calls to the operating system from programs or applications executing on data processing system 200.

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide an infrastructure that allows for automating business processes to promote efficiency. Certain computer processes are often termed "business processes" by those skilled in the art, as these "business processes" are computer processes which are often customized to a particular company's needs and typically involve a fair amount of user interaction. Some monolithic applications in a business system may not have programmatic interfaces that allow the business process automation tools in the system to interact with the applications, thereby preventing manual business processes performed using these applications from being automated within the business system. The illustrative embodiments address this problem by providing interfaces between these monolithic applications and the business process automation tools to connect business process activities to functional test scripts to allow for manual tasks performed by the monolithic applications to be automated. The interfaces may be used in any situation where it may be impossible, difficult, uneconomical, or too time consuming to implement real programmatic interfaces with the monolithic applications.

The interfaces described in the illustrative embodiments enable a monolithic application to be easily integrated with business process automation frameworks, such as Websphere Process Server. WebSphere Process Server, a product of International Business Machines Corporation, is a business process server that provides a single programming model for Service Oriented Architecture (SOA) which enables the automation of business processes by visually describing workflows including both automated services and human tasks. Websphere Process Server uses BPEL (Business Process Execution Language), an XML-based language, to model and describe business processes.

With WebSphere Process Server, a user may employ business process modeling tools to build business process interactions to form a workflow. This flow comprises of several business activities that are linked together based on business rules. Different paths in the business process flow are taken based on previous conditions of the output of the previous business activities. When a user encounters a manual step in the flow, the user may then reference a robotic test script name and input parameters via an interface between the business process server and a test script server, and an interface between the test script server and the business process automation tools. These interfaces provide a new capability for business process automation by allowing business process activities to access functional test scripts to automate manual tasks. The interface between the test script server and the business process automation tools also provides a mechanism to translate business activity inputs into test script parameters to dynamically drive the automated tasks. The interface also provides a mechanism to return the state of the automated tasks to the business process activity so that dynamic decisions may be made in the business process based on the results of the robotic test script execution.

The test script server centrally controls the automation tools and connects to any number of business process activities in the business process server. A robotic test script is a functional test script comprising the recorded process interactions of the manual task. When a robotic test script is referenced via the interfaces, the script may be played back to automate the manual task. A test automation tool may be used to extract key input parameters for the recorded script into a data file, also called a datapool. The datapool contains the key value pairs used by the recorded script. In other words, business activity inputs are translated into datapool parameters which drive the robotic test script. For example, in a workflow for hiring a new employee, unique values may be extracted from the recorded script, such as new employees name, address, social security number, etc. to enable the user to provide those custom values to the robotic test script at runtime. The process steps above may be performed in a business process modeling tool like Websphere Business Integration Modeler (aka WBI Modeler).

Figure 3:
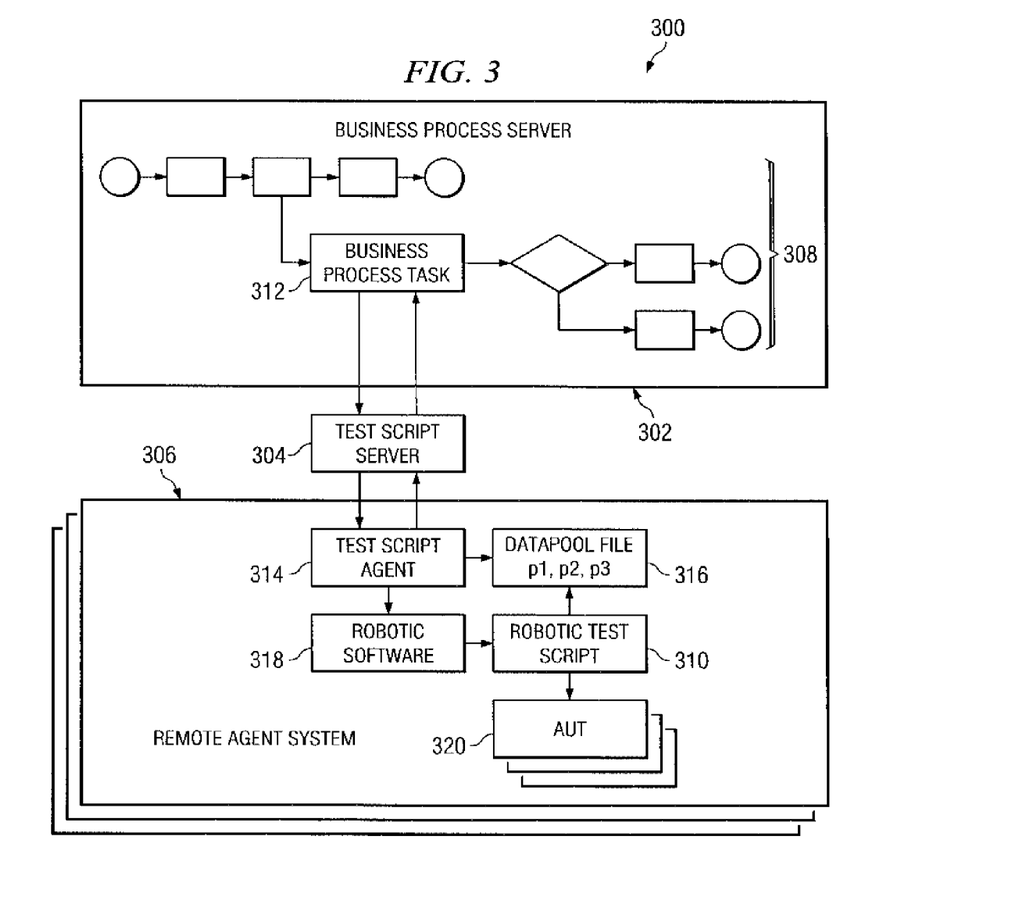
FIG. 3 is a block diagram of exemplary components for automating processes using data driven pre-recorded transactions in accordance with the illustrative embodiments.

FIG. 3 is a block diagram of exemplary components for automating processes using data driven pre-recorded transactions in accordance with the illustrative embodiments. In this illustrative example, automated business processing system 300 comprises business process server 302, test script server 304, and one or more remote agent systems 306. Manual business activities on business process server 302, such as business process task 312, may be connected to test script server 304 via an interface which allows the manual business activity to be automated. An interface between test script server 304 and a test script agent on remote agent system 306, such as test script agent 314, provides the connection to business process automation tools used to automate the manual business activity.

Business process server 302 is an example of a server, such as servers 104 and 106 in FIG. 1. Business process server 302 is a business process server that supports describing and implementing workflows and automating business processes in a Service Oriented Architecture (SOA). Business process server 302 handles the invocation of services in the SOA using business process models. In one example, a business process model may be represented in business process server 302 using Business Process Execution Language (BPEL) which defines a model and a grammar for describing the behavior of a business process based on interactions between the processes.

Business process server 302 may execute the business model by directing the invocation of the services in a workflow. Workflows, such as workflow 308, may be created using a business transaction modeler, such as, for example, WebSphere Business Integration (WBI) Modeler. WBI Modeler models business transactions in BPEL and provides a graphical user interface that allows one to create visual workflow diagrams illustrating what the business process looks like. Workflow 308 within business process server 302 represents steps in a business process. For example, workflow 308 may represent a full business process for hiring a new employee, including all of the process steps for hiring the new employee, such as creating a new employee ID in a human resources database, issuing a new email address to the new employee, and the like.

Each manual task in workflow 308 may invoke test script server 304 to invoke a robotic test script specific to the business process. Methods of invoking a robotic test script may include, for example, invocations from a command line interface between business process task 312 and test script server 304, such as Manager.sh -invoke <TestName> -parameters <value1, value2, . . . , valueN> -on Agents <hostname1, hostname2, . . . , hostnameN> and invocations from Web services such as

BPMInvocationService.invokeTest(testName,inputParameters)

where testName is the name of an existing robotic test script stored on Test Script Server 304, and the inputParameters are a list of custom input parameters in a datapool that match the expected values for the particular robotic test script name. The invocation of the automated business process from any step in the workflow allows the manual processes in the workflow to be integrated with the business process automation tools.

Test script server 304 is an example of a server, such as servers 104 and 106 in FIG. 1. Test Script Server 304 centrally controls the automated tasks. Test script server 304 invokes a particular robotic test script upon request from a business activity, such as business process task 312, to automate the manual task. A robotic test script, such as robotic test script 310, is a script that is used to perform an automated business task in a workflow, such as, for example, issuing a new email address to a new employee. Robotic test script 310 may be generated using any robotic test software that allows one to record a user's interactions with an application that performs a particular business task. The interactions may represent any business process. For instance, if user wants to test an online banking application, the user may test whether a customer may login to the banking system by selecting a record option in the robotic test software. When the customer tries to login to the banking system, the robotic test software will record all of the user's interactions with the banking system. Parameters may be defined by the user that allows certain data to be extracted from the interactions as datapool values. A datapool is a test dataset which is used to supply input data values to the variables in the robotic test script during playback of the script.

The recorded test script of the interactions with the banking system is then loaded into test script server 304. The user may play back robotic test script 310 comprising the recorded interactions to determine whether or not the login was successful. Thus, with the robotic test software, a robotic test script may be created that performs the business task, and that robotic test script may be driven using datapool inputs to automate the task. Examples of robotic test software products include Rational Robot, Rational Performance Tester, Rational Functional Tester, and the like. Other methods of recording interactions include recording via Windows-based interactions (e.g., mouse clicks), from a command line, from a Web services invocation, or via any type of interaction/invocation (e.g., socket connection, SQL connection, Java Messaging Service (JMS) connection).

Once robotic test script 310 for a particular business task has been created, the now-automated business process task may be invoked by business process server 302. For example, business process task 312 modeled in business process server 302 invokes test script server 304 to invoke robotic test script 310 and the dynamic input parameters that are specific to the particular invocation of the business task. Test script server 304 then passes robotic test script 310 and parameter information to test script agent 314 in a remote agent system, such as remote agent system 306. An example interface between test script server 304 and test script agent 314 may include a JMX mbean invocation, such as RobotController.executeTest (testName, testLocation, datapoolName, datapoolLocation, timeout). Test script agent 314 is a playback agent which creates datapool file 316 using the passed-in input parameters. Datapool file 316 may be auto-generated by test script server 304 which reads the inputParameters as key value pairs and generates the data file. In this particular embodiment, test script server 304 generates a comma delimited list as a single row in a text file. In another implementation, test script server 304 may take a list of inputParameters and generate a set of rows in datapool file 316, so that the test script may be executed multiple times against each row in the datapool file. Datapool file 316 may be accessed in any order as long as each row is read and executed once and only once.

Test script agent 314 also invokes robotic test software 318 to play back the requested robotic test script 310. An example interface between test script agent 314 and robot test software 318 may include a command line executable, such as C:\Robot\bin\robot.exe -directory "C:\scriptDir" -scriptName "Script1" -dataPoolDir "C:\datapools". As robotic test script 310 runs, robotic test script 310 loads its runtime data values from datapool file 316 and interacts with one or more applications under test, such as AUT 320, to perform business process task 312. It should be noted that a given test script may interact with any number of AUTs in a single test, so the granularity of the automated business process may touch several different systems in one test.

When the business process task is performed with application under test 320 using robotic test script 310, the success or failure of the automated task is propagated to test script server 304 from test script agent 314. The execution status is then propagated back to the Web service requester in business process server 302 from test script server 304. Workflow 308 continues with its logic depending on if robotic test script 310 for automated business process task 312 was a success or a failure.

Figure 4:
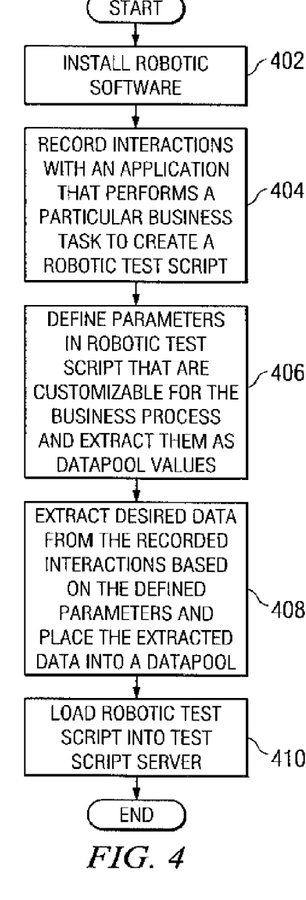
FIG. 4 is a flowchart of a process for defining a new automated task in accordance with the illustrative embodiments.

FIG. 4 is a flowchart of a process for defining a new automated task in accordance with the illustrative embodiments. The process described in FIG. 4 may be implemented in a data processing system, such as automated business processing system 300 in FIG. 3.

The process begins with a user installing a robotic test script software product, such as, for example, Rational Robot, Rational Performance Tester, or Rational Functional Tester, in the distributed data processing system (step 402). The user then employs the robotic test script software to record any interactions with an application that performs a particular business task (step 404) to create a robotic test script. The user may then define certain parameters in the robotic test script that are customizable for the business process task (step 406). Based on the defined parameters, the user may specify that certain desired data be extracted from the recorded interactions and placed in a datapool (step 408). The user loads the robotic test script into a test script server, where the robotic test script may be invoked remotely by other systems (step 410), with the process terminating thereafter.

Figure 5:
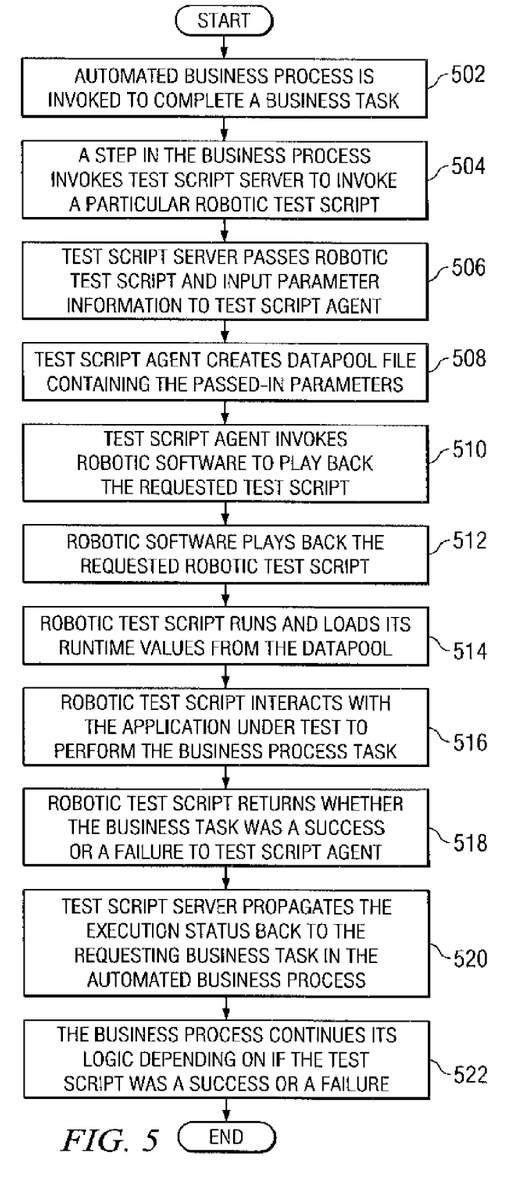
FIG. 5 is a flowchart of a process for invoking an automated task in accordance with the illustrative embodiments.

FIG. 5 is a flowchart of a process for the invocation of an automated task in accordance with the illustrative embodi-ments. The process described in FIG. 5 may be implemented in a data processing system, such as automated business processing system 300 in FIG. 3.

The process begins with the invocation of an automated business process to complete a business task (step 502). A particular step in the business process invokes a test script server to invoke a particular robotic test script (step 504). The robotic test script is associated with a set of dynamic input parameters which are specific to the particular invocation of the automated business process. As previously mentioned, a Web services method call may be issued which invokes a robotic test script by specifying the name of the robotic test script and the input parameters in a datapool that match the expected values for the particular robotic test script name.

The test script server then passes the robotic test script and the input parameter information to a test script agent (step 506). The robotic test script is also copied to the remote agent system so that the robotic test script may be invoked by the test script agent. The test script agent then creates a datapool file which contains the passed-in parameters (step 508). The test script agent invokes the robotic test script software, such as the robotic test script software installed in step 402 of FIG. 4, to play back the requested robotic test script (step 510).

When the robotic test script software plays back the requested robotic test script (step 512), the robotic test script runs and loads its runtime values from the datapool (step 514). The robotic test script interacts with the application under test to perform the automated business process task (step 516). The robotic test script returns whether the business task was a success or a failure to the test script agent (step 518). The test script server propagates the execution status back to the requesting business task in the automated business process in the business process server (step 520). The business process continues with its logic depending upon if the robotic test script was successful or not (step 522), with the process terminating thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automating an activity in a workflow using data driven pre-recorded transactions, the computer implemented method comprising:

receiving, at a test script server, a request from a process server to automate an activity in a workflow, wherein the test script server provides a connection between one or more activities in the workflow on the process server and robotic test scripts used to automate the one or more activities;

responsive to receiving the request at the test script server, invoking a robotic test script that comprises recorded steps used to complete the activity;

using a remote test script agent to play back the robotic test script, wherein the robotic test script is driven by a set of input parameters obtained from recording the activity, and wherein the robotic test script interacts with an application under test to perform the activity as an automated task;

returning an execution status indicating whether automation of the activity was a success or a failure;

propagating the execution status back to the activity; and continuing the workflow based on the success or failure of the automation.

2. A computer implemented method for automating an activity in a workflow using data driven pre-recorded transactions, the computer implemented method comprising:

receiving, at a test script server, a request from a process server to automate an activity in a workflow, wherein the test script server provides a connection between one or more activities in the workflow on the process server and robotic test scripts used to automate the one or more activities;

responsive to receiving the request at the test script server, invoking a robotic test script that comprises recorded steps used to complete the activity;

using a remote test script agent to play back the robotic test script, wherein the robotic test script is driven by a set of input parameters obtained from recording the activity, and wherein the robotic test script interacts with an application under test to perform the activity as an automated task;

recording interactions with an application that performs the activity to create the robotic test script;

defining the set of input parameters in the robotic test script specific to the activity;

extracting data from the recorded interaction based on the set of input parameters;

placing the data into a datapool, wherein the datapool comprises data values for variables in the robotic test script; and loading the robotic test script into the test script server.

3. A computer implemented method for automating an activity in a workflow using data driven pre-recorded transactions, the computer implemented method comprising:

receiving, at a test script server, a request from a process server to automate an activity in a workflow, wherein the test script server provides a connection between one or more activities in the workflow on the process server and robotic test scripts used to automate the one or more activities;

responsive to receiving the request at the test script server, invoking a robotic test script that comprises recorded steps used to complete the activity; and using a remote test script agent to play back the robotic test script, wherein the robotic test script is driven by a set of input parameters obtained from recording the activity, and wherein the robotic test script interacts with an application under test to perform the activity as an automated task, wherein the set of input parameters are obtained from a datapool, wherein the datapool comprises data values for variables in the robotic test script.

4. The computer implemented method of claim 3, wherein the datapool is created by the remote test script agent based on runtime values provided from an invocation of the activity.

5. A computer implemented method for automating an activity in a workflow using data driven pre-recorded transactions, the computer implemented method comprising:

receiving, at a test script server, a request from a process server to automate an activity in a workflow, wherein the test script server provides a connection between one or more activities in the workflow on the process server and robotic test scripts used to automate the one or more activities;

responsive to receiving the request at the test script server, invoking a robotic test script that comprises recorded steps used to complete the activity; and using a remote test script agent to play back the robotic test script, wherein the robotic test script is driven by a set of input parameters obtained from recording the activity, and wherein the robotic test script interacts with an application under test to perform the activity as an automated task, wherein the remote test script agent invokes a robotic test script software to play back the robotic test script, wherein the remote test script agent returns an execution status to the test script server indicating whether automation of the activity was a success or a failure, the test script server propagates the execution status back to the activity, and the workflow continues based on the success or failure of the automation.

6. A data processing system for automating an activity in a workflow using data driven pre-recorded transactions, the data processing system comprising:

a process server comprising process modeling tools for creating a workflow of a set of process interactions, wherein the workflow comprises a plurality of activities linked together based on a set of rules;

a test script server connected to one or more activities in the workflow on the process server, wherein the test script server receives requests from the one or more activities to automate an activity; and a remote test script agent connected to the test script server, wherein the remote test script agent receives instructions from the test script server to play back a robotic test script of the activity, wherein the robotic test script is driven by a set of input parameters obtained from recording the activity, and wherein the robotic test script interacts with an application under test to perform the activity as an automated task, wherein the remote test script agent returns an execution status to the test script server indicating whether automation of the activity was a success or a failure, the test script server propagates the execution status back to the activity, and the workflow continues based on the success or failure of the automation.

7. A data processing system for automating an activity in a workflow using data driven pre-recorded transactions, the data processing system comprising:

a process server comprising process modeling tools for creating a workflow of a set of process interactions, wherein the workflow comprises a plurality of activities linked together based on a set of rules;

a test script server connected to one or more activities in the workflow on the process server, wherein the test script server receives requests from the one or more activities to automate an activity; and a remote test script agent connected to the test script server, wherein the remote test script agent receives instructions from the test script server to play back a robotic test script of the activity, wherein the robotic test script is driven by a set of input parameters obtained from recording the activity, and wherein the robotic test script interacts with an application under test to perform the activity as an automated task, wherein the set of input parameters are obtained from a datapool, wherein the datapool comprises data values for variables in the robotic test script.

8. The data processing system of claim 7, wherein the datapool is created by the remote test script agent based on runtime values provided from an invocation of the activity.

9. A computer program product for automating an activity in a workflow using data driven pre-recorded transactions, the computer program product comprising:

a computer-readable storage medium having computer usable program code tangibly embodied thereon, the computer usable program code comprising:

computer usable program code for receiving, at a test script server, a request from a process server to automate the activity in the workflow, wherein the test script server provides a connection between one or more activities in the workflow on the process server and robotic test scripts used to automate the tasks;

computer usable program code for invoking a robotic test script that comprises recorded steps used to complete the activity in response to receiving the request at the test script server;

computer usable program code for using a remote test script agent to play back the robotic test script, wherein the robotic test script is driven by a set of input parameters obtained from recording the activity, and wherein the robotic test script interacts with an application under test to perform the activity as an automated task;

computer usable program code for returning an execution status indicating whether automation of the activity was a success or a failure;

computer usable program code for propagating the execution status back to the activity; and computer usable program code for continuing the workflow based on the success or failure of the automation.

10. A computer program product for automating an activity in a workflow using data driven pre-recorded transactions, the computer program product comprising:

a computer-readable storage medium having computer usable program code tangibly embodied thereon, the computer usable program code comprising:

computer usable program code for receiving, at a test script server, a request from a process server to automate the activity in the workflow, wherein the test script server provides a connection between one or more activities in the workflow on the process server and robotic test scripts used to automate the tasks;

computer usable program code for invoking a robotic test script that comprises recorded steps used to complete the activity in response to receiving the request at the test script server;

computer usable program code for using a remote test script agent to play back the robotic test script, wherein the robotic test script is driven by a set of input parameters obtained from recording the activity, and wherein the robotic test script interacts with an application under test to perform the activity as an automated task;

computer usable program code for recording interactions with an application that performs the activity to create the robotic test script;

computer usable program code for defining the set of input parameters in the robotic test script specific to the activity;

computer usable program code for extracting data from the recorded interaction based on the set of input parameters;

computer usable program code for placing the data into a datapool, wherein the datapool comprises data values for variables in the robotic test script; and computer usable program code for loading the robotic test script into the test script server.

11. A computer program product for automating an activity in a workflow using data driven pre-recorded transactions, the computer program product comprising:

a computer-readable storage medium having computer usable program code tangibly embodied thereon, the computer usable program code comprising:

computer usable program code for receiving, at a test script server, a request from a process server to automate the activity in the workflow, wherein the test script server provides a connection between one or more activities in the workflow on the process server and robotic test scripts used to automate the tasks;

computer usable program code for invoking a robotic test script that comprises recorded steps used to complete the activity in response to receiving the request at the test script server; and computer usable program code for using a remote test script agent to play back the robotic test script, wherein the robotic test script is driven by a set of input parameters obtained from recording the activity, and wherein the robotic test script interacts with an application under test to perform the activity as an automated task, wherein the set of input parameters are obtained from a datapool, wherein the datapool comprises data values for variables in the robotic test script.

12. The computer program product of claim 11, wherein the datapool is created by the remote test script agent based on runtime values provided from an invocation of the activity.

13. A computer program product for automating an activity in a workflow using data driven pre-recorded transactions, the computer program product comprising:

a computer-readable storage medium having computer usable program code tangibly embodied thereon, the computer usable program code comprising:

computer usable program code for receiving, at a test script server, a request from a process server to automate the activity in the workflow, wherein the test script server provides a connection between one or more activities in the workflow on the process server and robotic test scripts used to automate the tasks;

computer usable program code for invoking a robotic test script that comprises recorded steps used to complete the activity in response to receiving the request at the test script server; and computer usable program code for using a remote test script agent to play back the robotic test script, wherein the robotic test script is driven by a set of input parameters obtained from recording the activity, and wherein the robotic test script interacts with an application under test to perform the activity as an automated task, wherein the remote test script agent comprises computer usable program code for invoking a robotic test script software to play back the robotic test script, wherein the remote test script agent returns an execution status to the test script server indicating whether automation of the activity was a success or a failure, the test script server propagates the execution status back to the activity, and the workflow continues based on the success or failure of the automation.

* * * * *